United States Patent [19]

Hirose et al.

[11] Patent Number: 4,755,046
[45] Date of Patent: Jul. 5, 1988

[54] INFORMATION PROJECTING APPARATUS

[75] Inventors: Yoshihiko Hirose, Yokohama; Noboru Koumura, Narashino; Tadashi Sato, Kokubunji; Shigeru Sugita, Sayama; Yasutoshi Sugita, Tokyo, all of Japan

[73] Assignee: Canon Kabushiki Kaisha, Tokyo, Japan

[21] Appl. No.: 790,313

[22] Filed: Oct. 22, 1985

[30] Foreign Application Priority Data

Dec. 7, 1984 [JP] Japan ............................ 59-258563

[51] Int. Cl.⁴ ............................................ G03B 21/10
[52] U.S. Cl. ................................................ 353/26 R
[58] Field of Search ............... 353/25 R, 27 R, 27 A, 353/26 R, 26 A, 96, 103; 352/72, 73, 78 R, 78 C, 123, 8; 242/180, 200, 181, 205, 201, 203, 67.3 R, 197; 360/92, 93, 94, 95, 96.1, 96.2

[56] References Cited

U.S. PATENT DOCUMENTS

| | | | |
|---|---|---|---|
| 1,347,875 | 7/1920 | Roderick | 352/123 |
| 2,606,409 | 8/1952 | Gordon | 352/244 |
| 3,144,228 | 8/1964 | Kass | 248/633 |
| 3,164,059 | 1/1965 | Turpentine | 353/26 A |
| 3,179,001 | 4/1965 | Silverman | 353/26 A X |
| 3,456,817 | 7/1969 | Irazoqui | 221/79 |
| 3,614,022 | 10/1971 | Henriksen | 242/181 X |
| 3,646,258 | 2/1972 | Lemelson | 352/8 X |
| 3,674,347 | 7/1972 | Iha | . |
| 3,712,719 | 1/1973 | Zanner | 352/73 |
| 3,722,988 | 3/1973 | Neudecker | 242/205 X |
| 3,945,647 | 3/1976 | Rangabe | 15/1.5 R |
| 4,025,176 | 5/1977 | Lopata | 353/26 A |
| 4,160,169 | 7/1979 | Endicott | 353/26 R X |
| 4,353,642 | 10/1982 | Weigert | 353/25 X |
| 4,357,615 | 11/1982 | Yoshiharu et al. | 15/210 R |

Primary Examiner—Harry N. Haroian
Attorney, Agent, or Firm—Fitzpatrick, Cella, Harper and Scinto

[57] ABSTRACT

An information projecting apparatus has a plurality of cartridges each containing an information recording medium are stored in a storage section. A desired cartridge in this storage section may be retrieved and transported to a first position. The recording medium in the cartridge placed in the first position is transported to a projecting unit, where the information of the recording medium is projected. When an outer cartridge containing an information recording medium is to be used instead of a cartridge from the storage section, the outer cartridge is disposed at a second position. The recording medium in the cartridge placed in the second position is transported to the projecting unit, and the information contained in the recording medium is projected at the projecting position.

25 Claims, 8 Drawing Sheets

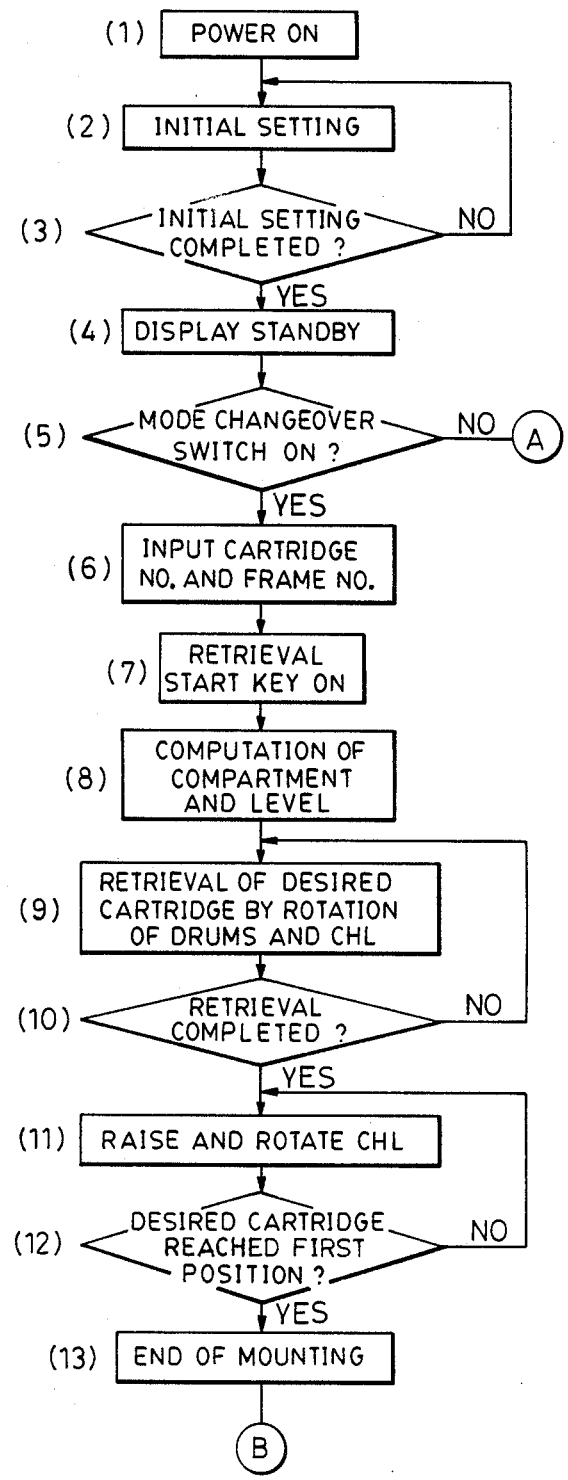

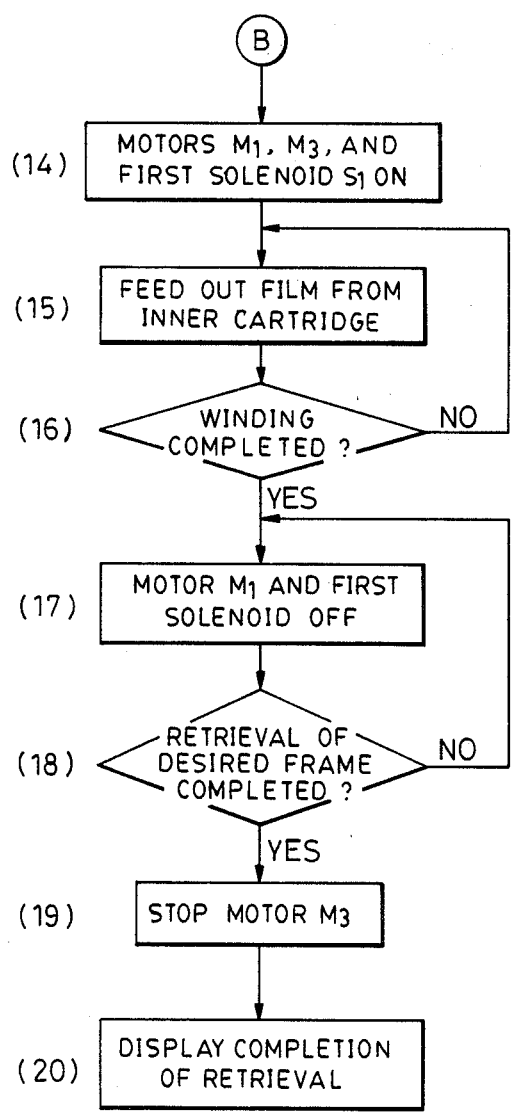

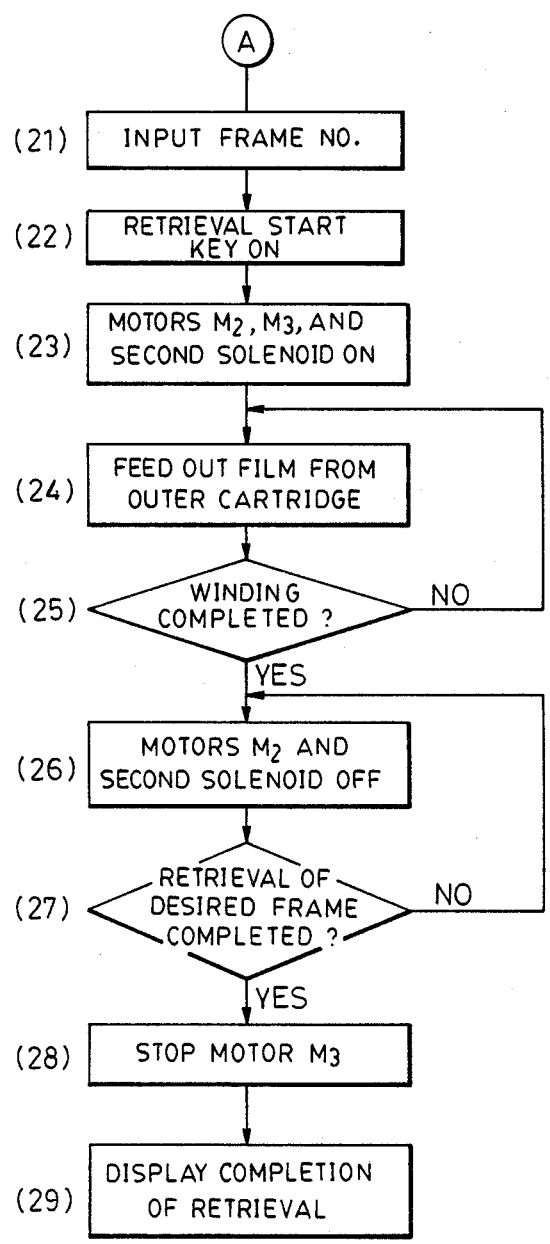

INFORMATION PROJECTING APPARATUS

BACKGROUND OF THE INVENTION

1. Field of the Invention

The present invention relates to an information projecting apparatus which houses a plurality of cartridges each of which contains an information recording medium, such as microfiche or roll microfilm.

2. Description of the Prior Art

Conventionally, this type of apparatus comprises a storage section which houses a plurality of cartridges each of which contains microfiche or roll microfilm as well as a retrieving mechanism which selects a desired cartridge from the storage section, automatically transports the film from this cartridge, retrieves a desired frame, and stops the same at a predetermined position, whereupon the frame of the retrieved film is projected onto the screen of a reader unit or onto copying paper or the like of a printer unit. A support for storing a plurality of cartridges at a projection station which is illustrative of prior art devices is shown in U.S. Pat. No. 3,674,347 which issued to Iha on Jul. 4, 1972.

With the information projecting apparatus according to the prior art, there is a delay between the time when a desired cartridge is selected and retrieved from the storage section and the time when the information on the film inside the cartridge is projected. Moreover, since the number of cartridges that can be stored is limited by the size of the storage section, it has not been possible prior to the present invention to increase the capacity of this type of information projecting apparatus. Another drawback with prior art equipment is the delay from the time the retrieved cartridge is returned to the original position of the storage section after using it to the time when the cartridge to be used next is retrieved. This makes it impossible to make use of the projecting section during this operation.

SUMMARY OF THE INVENTION

Accordingly, an object of the present invention is to overcome the aforementioned drawbacks by providing an information projecting apparatus capable of using a large number of cartridges.

Another object of the invention is to provide an information projecting apparatus capable of using a number of cartridges greater than the maximum number of cartridges that can be stored in the storage section.

Still another object of the invention is to provide an information projecting apparatus capable of selectively using a cartridge stored in the storage section and an outer cartridge which is not stored in the storage section but instead is inserted from outside the apparatus.

A further object of the invention is to provide an information projecting apparatus capable of diminishing the period of nonuse of an information projecting section, thereby making it possible to utilize more effectively the information projecting section.

A still further object of the invention is to provide an information projecting apparatus implemented by means of a simple structure capable of selectively using a cartridge stored in the storage section or an outer cartridge by a common projecting section.

According to one aspect of the present invention, there is provided an information projecting apparatus for selecting one of a plurality of cartridges each containing an information recording medium and for projecting the information recorded on the recording medium. The invention in this aspect comprises a cartridge storing means for storing a plurality of cartridges within the apparatus; a cartridge transporting means for transporting a cartridge selected from the cartridge storing means to a first position; a cartridge holding means for holding a cartridge inserted from outside the apparatus at a second position; and a recording medium for transporting to a projecting unit the recording medium of the cartridge placed in the first position or the cartridge placed in the second position.

According to a further aspect of the present invention, there is provided an information readout apparatus for reading the information from a recording medium contained within a cartridge. The invention in this aspect comprises a cartridge storing means for storing a plurality of cartridges; a cartridge moving means for removing a desired cartridge stored in the storing means and for moving the removed cartridge to a first position; a cartridge inserting slot for inserting an outer cartridge; a holding means for holding the outer cartridge inserted from the inserting slot at a second position; and a readout means for reading the information of said recording medium in the cartridge placed in the first position or the second position.

BRIEF DESCRIPTION OF THE DRAWINGS

A preferred embodiment of the present invention is described herein with reference to the attached drawings forming part of the specification, wherein:

FIGS. 6 to 8 are flowcharts illustrating the operation of the aforementioned apparatus.

DETAILED DESCRIPTION OF THE PREFERRED EMBODIMENTS

Figure 1:
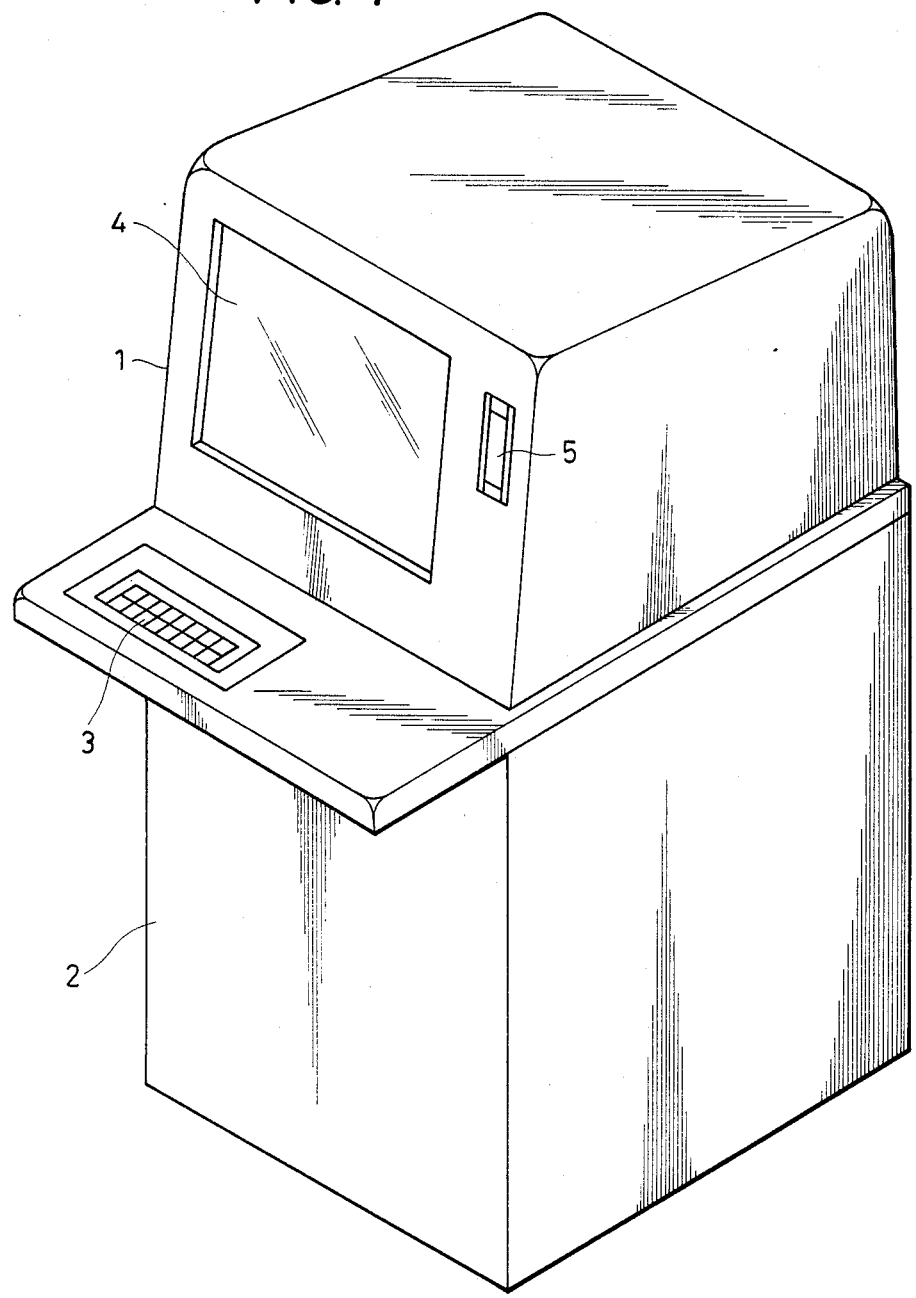
FIG. 1 is an external view of a film reader/projector/printer provided with an apparatus of the present invention.

FIG. 1 shows a film reader/projector/printer according to the prevent invention. The overall apparatus comprises an upper or first housing 1, a lower or second housing 2, and a control panel 3 for issuing instructions for various operations. A screen 4 for displaying recorded information and a slot 5 for inserting an outer cartridge are provided on the front of the upper housing 1.

Figure 2:
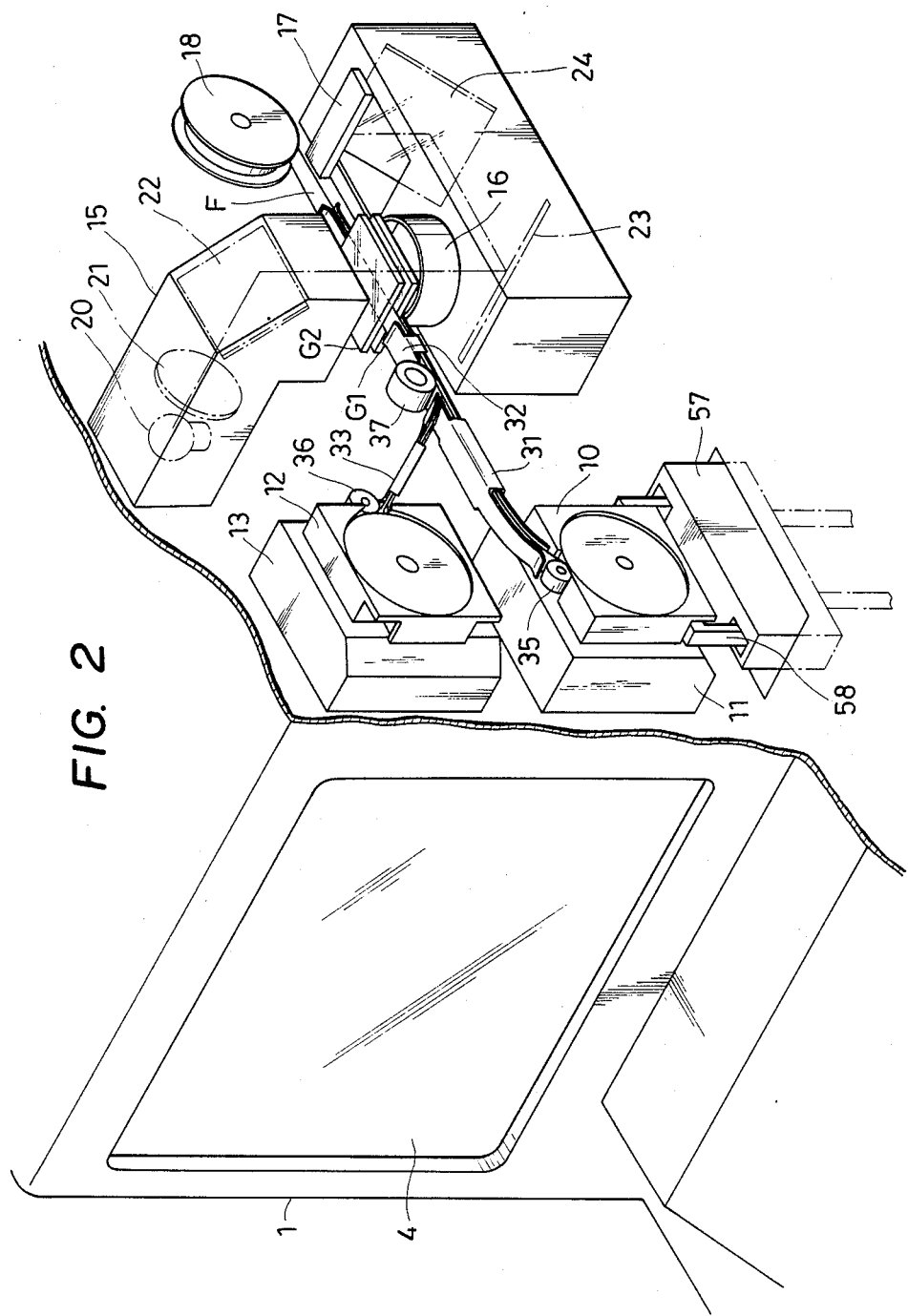
FIG. 2 is a cut-away perspective view illustrating an internal mechanism of an upper housing portion of the film reader/projector/printer of FIG. 1.

As shown in FIG. 2, the following are disposed inside the upper housing 1: an inner cartridge receiving member 11 for retaining at a first position an inner cartridge 10 automatically selected from the cartridge storage section inside the lower housing 2; an outer cartridge receiving member 13 for retaining at a second position an outer cartridge 12 manually inserted from the slot 5 for inserting an outer cartridge; an illuminating section 15 for illuminating a microfilm sent out from a cartridge 10 or 12; an imaging lens 16; an image sensor 17; a takeup reel 18; and the like. The outer cartridge receiving member 13 is disposed above the inner cartridge receiving member 11. The first and second housings 1 and 2 may be separable; and it also is possible to use the first housing independently of the second housing. The films inside the cartridges 10 and 12 are each wound in the form of a roll around a shaft. The illuminating section 15 includes a lamp 20, a condenser lens 21, and a mirror 22. The light applied by the lamp 20 is projected onto a microfilm F disposed between a pair of glass plates G1 and G2 via the condenser lens 21 and the mirror 22. The light transmitted through the microfilm 10 passes through the imaging lens 16 and is reflected by the mirrors 23 and 24 so as to be projected onto the image sensor 17. The image sensor 17 is constituted by an array of light receiving elements such as charge coupled diodes (CCD's) and is adapted to convert the image recorded on a microfilm into electric signals. The picture signal outputted by the image sensor is processed by a signal processing circuit before it is sent to a conventional printer such as a laser beam printer; and a reproduced picture is made by the printer from the projected image. If the aforementioned apparatus is used as a reader, the light passing the imaging lens 16 is projected onto the screen 4 via an optical system (not shown); and the picture of the microfilm is observed on the screen. Instead of using the image sensor 17, it is possible to effect reproduction of the image by placing a well known photosensitive device in this position.

Figure 3:
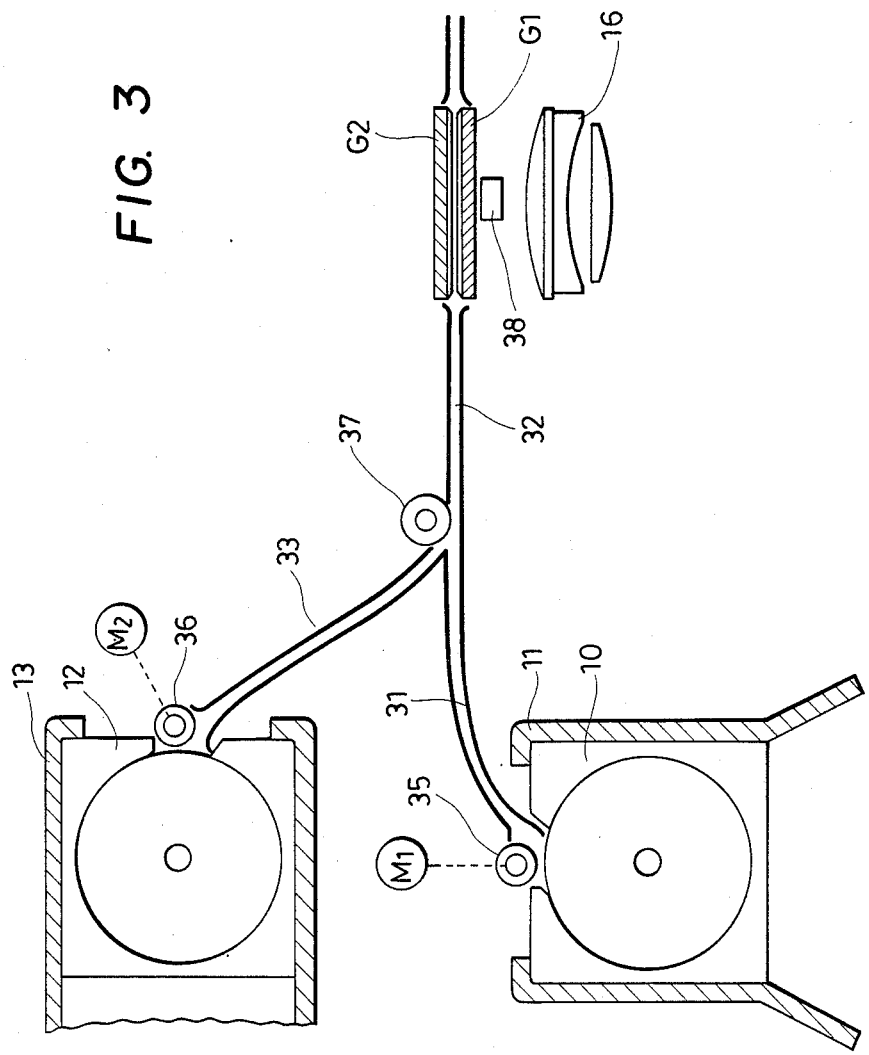
FIG. 3 is a side elevational view illustrating film guiding passages in the mechanism of FIG. 2.

FIG. 3 shows a microfilm supplying passage arrangement in which the microfilm in the inner cartridge 10 passes through a first passage 31 and then through a second passage 32. The microfilm then passes between the glass plates G1 and G2 so as to be guided to the takeup reel 18. The microfilm in the outer cartridge 12 passes through the second passage 32 via a third passage 33 and then passes between the glass plates G1 and G2 so as to be guided to the takeup reel 18. The first and third passages 31 and 33 converge at the second passage 32; and the microfilms in the cartridges 10 and 12 are each supplied along the common second passage 32. Film guide plates are provided along each of the passages 31 to 33; and each film is guided to a predetermined passage by means of the film guide plates. Reference numerals 35 and 36 in FIG. 3 denote film feed out rollers, while reference numerals 37 and 38 denote a film guide roller and a mark detector, respectively.

The film feed out roller 35 is coupled with a film drive motor $M_1$. The film feed out roller 35 is also arranged to be moved by means of a first solenoid (not shown) inwardly toward the film from the cartridge 10 driving the film, and outwardly away from the film for allowig it to be moved independently of the roller. Additionally, the film feed out roller 36 is coupled with a film drive motor $M_2$. The film feed out roller 36 is also arranged to be moved by a second solenoid (not shown) inwardly toward the film from the cartridge 12 for driving the film, and outwardly away from the film for allowing it to be moved independently of the roller.

When the inner cartridge 10 is used, the roller 35, is rotating and, upon receipt of an instruction for retrieval, is moved to a position where it comes into contact with the microfilm F in the cartridge. The leading edge of the microfilm is engaged by the roller 35 to extract the film from the cartridge 10. The film F is then supplied to the takeup reel 18 after passing through the first passage 31 and the second passage 32. The takeup reel 18 is driven by the motor at the time of the issuance of an instruction for retrieval, and automatically takes up the leading edge of the microfilm when the leading edge of the film is sent to it. When the leading edge of the microfilm is wound around the takeup reel 18, the rotation of the roller 35 stops, and at the same time the roller 35 moves to a position away from the film. Subsequently, the film is withdrawn from the inner cartridge and is taken up by the rotation of the takeup reel 18. When rewinding the microfilm back into the cartridge 10, the shaft in the cartridge 10 is rotated in the takeup direction by another motor (not shown).

When the outer cartridge 12 is used, the roller 36 is rotating and, upon receipt of an instruction for retrieval, is moved to a position where it comes into contact with the microfilm in the cartridge 12. The leading edge of the microfilm is engaged by and is fed out from the cartridge 12 by the roller 36. After passing through the second passage 32 and the third passage 33, the film is supplied to and is taken up by the takeup reel 18, as in the aforementioned case. When the leading edge of the microfilm is wound around the takeup reel 18, the rotation of the roller 36 stops, and at the same time the roller 36 moves to a position away from the film. Subsequently, the film is withdrawn from the outer cartridge by the rotation of the takeup reel and is taken up by the takeup reel. When rewinding the microfilm back into the cartridge 12, the shaft in the cartridge 12 is rotated by a motor (not shown) in the takeup direction.

The mark detector 38 (FIG. 3) is used to detect counting marks provided on the side portion of each frame of the microfilm; and it is constituted by a photoelectric transducer. The opaqueness of the marks on the microfilm differs from that of the adjacent area; and a mark detecting signal is produced by the mark detector 38 as the light incident upon the mark detector 38 is disrupted by the marks when the microfilm is supplied. The mark detecting signal produced by the mark detector when it has detected a mark is counted by a counting unit; and it is possible to detect a desired frame by comparing the count of the counting unit with the address number of a desired frame and by stopping the film when the two coincide. The retrieved frame then is in the correct position in optical path for projection. Detailed description of this retrieving apparatus will be omitted since it is disclosed in Japanese Patent Laid-Open No. 15691/1980.

Figure 4:
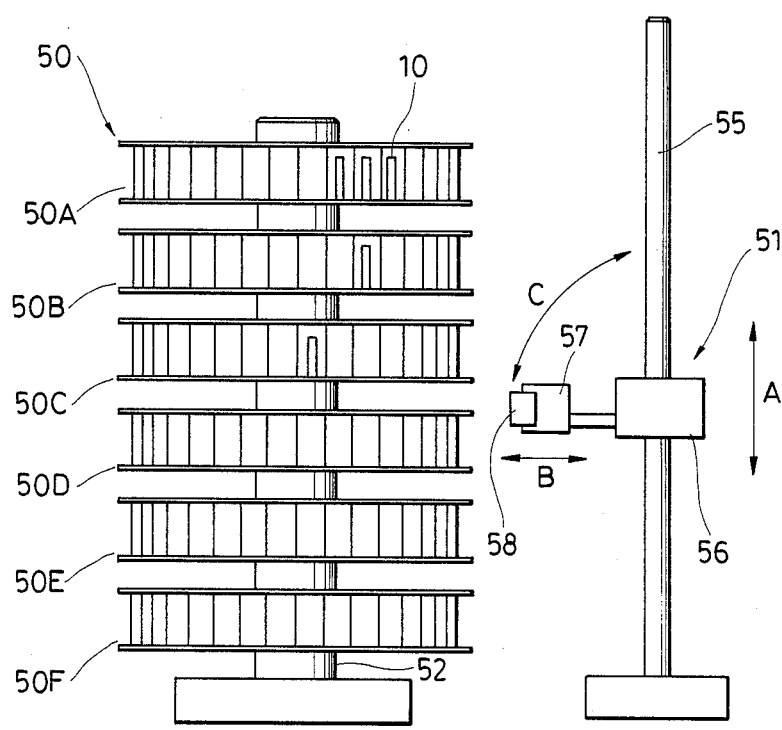
FIG. 4 is a side elevational view illustrating part of an internal mechanism of a lower housing portion of the film reader/projector/printer of FIG. 1.

As shown in FIG. 4, there are provided inside the lower housing 2 a cartridge storing section 50 for storing a multiplicity of cartridges as well as a cartridge handling lift 51 (hereinafter referred to as "CHL") for selectively removing one of the cartridges stored in the storage section 50 and for transporting it to the first position.

Drums 50A to 50F are stacked at fixed intervals in the cartridge storage section 50 to accommodate the inner cartridges 10 in radially arranged patterns. Each of the drums 50A to 50F is adapted to rotate with a rotating shaft 52 as its center. Each drum is similar in construction, with compartments for separating the cartridges and for storing them being arranged radially therein.

The CHL comprises a lifting member 56 adapted to be raised and lowered (in the direction of the arrow A) along a pole 55 which is vertically positioned in the vicinity of the cartridge storage section 50. A moving member 57 disposed on the lifting member 56 is adapted to advance and retreat in the horizontal direction (in the direction of the arrow B) on the lifting member 56. A hand 58, disposed at the tip of the moving member 57, is adapted to grip a cartridge 10. The moving member 57 is adapted to reciprocate between an advance terminating position, allowing a cartridge stored in the storage section 50 to be gripped by the hand 58, and a retreat terminating position, for positioning the cartridge gripped by the hand on the outside of the storage section 50. The moving member 57 is also adapted to rotate (in the direction of the arrow C) from a horizontal state to a vertical state. The hand 58 is a claw-like structure capable of gripping a cartridge and is adapted to be capable of gripping or releasing the cartridge.

In the aforementioned arrangement, the moving member 57 is initially in the horizontal and retreat terminating position shown in FIG. 4. At the same time the lifting member 56 is in its home position at the bottom or intermediate portion of the pole 55.

An instruction for starting retrieval is given by inputting the number of a desired cartridge and the number of a desired frame within the cartridge into the inputting device of the control panel 3. Upon receiving such an instruction, the lifting member 56 moves vertically to the position of a drum in which the desired cartridge is stored, and at the same time the drums rotate. When the drum compartment in which the desired cartridge is stored moves to the position which allows it to be gripped by the hand 58, the rotation of the drums stops with the desired cartridge and the hand 58 facing each other. The moving member 57 is advanced to the advance terminating position, and, when the hand 58 is brought into contact with the cartridge 10, the hand 58 is operated to grip the cartridge 10. After the cartridge is gripped, the moving member 57 is retracted, and when the moving member 57 reaches its retreat terminating position, the lifting member 56 is raised. At the same time, the moving member 57 is rotated to its upright position. The moving member 57 assumes its upright state before the lifting member 56 reaches the top of the pole 55. The cartridge 10, subsequently, is transported to an inner cartridge receiving member 11 and is placed in the first position by the upward movement of this lifting member 56. The cartridge 10 is held in the first position by means of the moving member 57 and the lifting member 56.

Next, the feed out roller 35, while rotating, is brought into contact with the film inside the cartridge 10 and transports the microfilm to the outside of the cartridge 10, whereupon a desired frame in the microfilm is retrieved. If an instruction for rewinding is given after the desired microfilm in the cartridge 10 is used at the projection unit or the printer unit, the microfilm is rewound into the cartridge 10. After completion of rewinding, the lifting member 56 holding the cartridge 10 is lowered, and the moving member 57 rotates to its horizontal position. When the lifting member 56 is lowered to the position of the drum for retracting the cartridge and the moving member 57 has assumed its horizontal position shown in FIG. 4, the cartridge can be returned to the original compartment by advancing the moving member 57. After returning the cartridge, the aforementioned operation is repeated when an instruction for retrieving a cartridge to be used next is given.

When an outer cartridge is to be used after using an inner cartridge, the outer cartridge is inserted into the outer cartridge inserting slot 5 while an inner cartridge is being retrieved or while the microfilm in an inner cartridge is being used. The outer cartridge 12 is then retained by the outer cartridge receiving member 13 and is placed in the second position. An instruction for starting retrieval is given by inputting the number of a desired frame within the outer cartridge 12 into the inputting device of the control panel 3. When the entire microfilm has been rewound into the inner cartridge 10, the feed out roller 36, while rotating, is brought into contact with a film stored in the outer cartridge 12 so as to feed the microfilm to the outside of the cartridge 12. In this manner, the desired frame of the microfilm in the outer cartridge 12 is retrieved.

Accordingly, it becomes possible to use the outer cartridge while the used inner cartridge is being returned. Therefore, the projection unit and the printer unit of the apparatus can be utilized efficiently. In addition, it becomes possible to increase the number of cartridges which may be used without expanding the storage section 50.

If an instruction for retrieving a desired inner cartridge is inputted into the inputting device while an outer cartridge is being used, the above described operation is carried out. In other words, the desired inner cartridge is transported by the inner cartridge receiving member 11 and placed in the first position, thereby making it possible to set the inner cartridge to be next used on standby in the first position. When the entire microfilm of the outer cartridge 12 has been rewound into the cartridge 12 after using the microfilm, it is possible to commence the operation of retrieving the microfilm stored in the inner cartridge which has been on standby in the first position. Accordingly, it is possible to make very effective use of the apparatus by alternately using the inner cartridge and the outer cartridge.

In the above described embodiment, one outer cartridge inserting slot is provided, and one position is set for holding the outer cartridge. However, it is also possible to provide at least two outer cartridge inserting slots, to separately provide positions for holding outer cartridges in correspondence with each inserting slot, and to supply each of the outer cartridges held in the respective positions selectively to a common passage.

Figure 5:
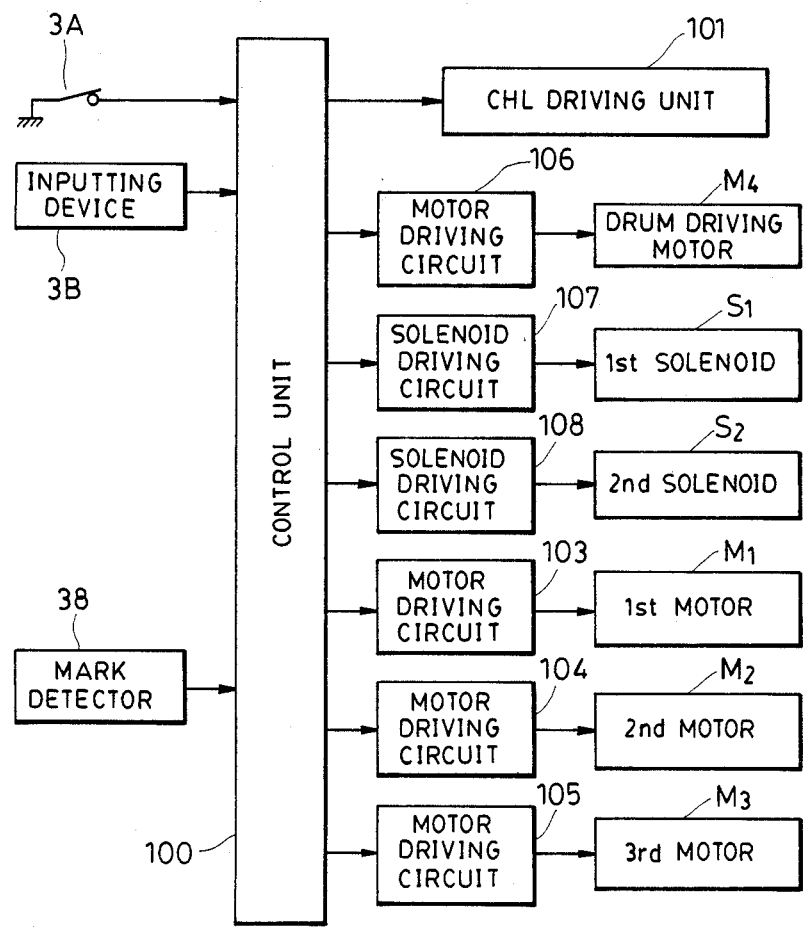
FIG. 5 is a block diagram of a retrieval control circuit for the film reader/projector/printer of FIG. 1.

FIG. 5 shows a block diagram of the retrieval control circuit of the above described apparatus, in which 3A denotes a mode changeover switch disposed on the control panel 3. The mode changeover switch 3A can be set to a mode for retrieving an inner cartridge stored in the storage section if the switch 3A is turned ON and to a mode for retrieving an outer cartridge if the switch is turned OFF. In FIG. 5, reference character 3B denotes an inputting device disposed on the control panel 3. The inputting device 3B comprises a power switch, a ten-key switch, a retrieval start command key, a print key, a rewinding key, and other appropriate control elements.

Reference numeral 100 denotes a control unit constituted by a microcomputer having a central processing unit (CPU), a read only memory (ROM) as a program memory, a random access memory (RAM) as a data memory, and other appropriate electronic elements. This control unit operates various drive portions in the predetermined sequence and performs various operations in accordance with a program stored in the ROM. In addition, the control unit 100 determines the presence of a microfilm mark on the basis of the output signal of the mark detector 38, and increments the count in the counting unit for each mark detected. Reference numeral 101 denotes a drive unit for driving the CHL 51. Reference character $M_1$ denotes a first motor for driving the feed out roller 35; $M_2$ denotes a second motor for driving the feed out roller 36; $M_3$ denotes third motor for driving the takeup reel 18; and $M_4$ denotes a drum driving motor for rotating the drums 50A to 50F inside the storage section 50. $S_1$ denotes a first solenoid for moving the feed out roller 35 to a position where it comes into contact with a film and to a position where it moves away from a film; and $S_2$ denotes a second solenoid for moving the feed out roller 36 to a position where it comes into contact with a film and to a position where it moves away from a film. Reference numerals 103 to 106 denote a motor driving circuit for controlling the coupled motors, $M_1$, $M_2$, $M_3$ and $M_4$, respectively. Reference numerals 107 and 108 denote solenoid driving circuits for controlling the coupled solenoids, respectively.

The first and second solenoids $S_1$ and $S_2$, when turned ON, move the coupled feed out rollers 35 and 36 to the position where they come into contact with the film, and, when turned OFF, move the respective rollers to a position away from the film.

FIGS. 6 to 8 show flowcharts illustrating the operation of the above described apparatus. When the power switch is turned ON in Step (1), the drums 50A to 50F are, in turn, rotated and are placed at a predetermined home position, i.e., at the position of a given angle of rotation. Then, the CHL 51 is placed in a predetermined home position (the initial setting operation), and the apparatus is set on stand-by (Step (4)).

The operation proceeds to Step (5), and, when using a cartridge in the storage section 50, the mode change-over switch 3A is turned ON. After turning ON the switch 3A, the number of a desired cartridge and the number of a desired frame are inputted by the ten-key switch of the inputting device 3B in Step (6), and then a retrieval start key is turned ON in Step (7).

In Step (8), on the basis of the inputted number of the cartridge, the control unit 100 computes the compartment number and level of the drum where the desired cartridge is present; operates the drums 50A to 50B on the basis of the computation; drives the CHL 51; and retrieves the desired cartridge (Step (9)). When the desired cartridge is retrieved (Step (10)) and is gripped by the hand 58, the lifting member 56 is raised, and the moving member 57 rotates (Step (11)). When the desired cartridge reaches the first position (Step (12)), the retrieved cartridge 10 is mounted on the inner cartridge receiving member 11, and the mounting operation is thereby completed (Step (13)). Then, the operation proceeds to Step (14), shown in FIG. 7, the motors $M_1$ and $M_3$ and the first solenoid $S_1$ are turned ON, and the feed out roller 35 is brought into contact with the film of the cartridge 10 so as to feed out the film (Step (15)).

When the leading edge of the film is wound around the takeup reel 18 (Step (16)), the motor $M_1$ and the first solenoid $S_1$ are turned OFF (Step (17)). The motor $M_3$ continues to rotate, and feeding of the film to the takeup reel 18 is continued. When the desired frame is retrieved in Step (18), the motor $M_3$, stops in Step (19) and the film stops, thereby completing the retrieval operation (Step (20)). At this juncture, the desired frame is projected on the screen together with the information recorded in this frame. When the rewinding key of the inputting device 3B is turned ON after using this frame, a motor (not shown) coupled with the shaft in the inner cartridge 10 is driven, and the film is rewound into the cartridge 10. After completion of rewinding, the CHL 51 operates in reverse to the aforementioned procedure, thereby returning the used cartridge back to its original drum.

When using the outer cartridge, the mode change-over switch 3A is turned OFF in Step (5). When the switch 3A is turned OFF, the operation proceeds to Step (21) shown in FIG. 8. After mounting the outer cartridge 12 on the outer cartridge receiving member 13, the number of the desired frame is inputted by the ten-key switch of the inputting device 3B in Step (21), and the retrieval start key is turned ON in Step (22). In Step (23), the motors $M_2$ and $M_3$ and the second solenoid $S_2$ are turned ON, and the feed out roller 36 is brought into contact with the film of the cartridge 12 so as to feed out the film (Step (24)). When the film is wound around the takeup reel 18 (Step (25)), the motor $M_2$ and the second solenoid $S_2$ are turned OFF (Step (26)). The motor $M_3$ continues to rotate and the film continues to be fed to the takeup reel 18. When the desired frame is retrieved in Step (27), the motor $M_3$ stops in Step (28) to stop the film, thereby completing the retrieval operation (Step (29)). At this juncture, the desired frame is projected on the screen together with the information recorded in this frame. If the rewinding key of the inputting device 3B is turned ON after referring to this frame, the motor (not shown) coupled with the shaft of the outer cartridge 12 is driven, thereby rewinding the film back into the cartridge 12.

In the above described embodiment, although a cartridge housing roll film is employed, it is also possible to employ a cartridge which houses a plurality of microfiches or a cartridge housing magnetic tapes on which information is magnetically recorded. When using magnetic tapes, information is reproduced by means of a known magnetic reproducing apparatus.

In addition, the mechanism for selecting a cartridge stored in the storage section should not be restricted to the one described as it is possible to employ a number of well known cartridge selecting mechanisms to serve this purpose.

The present invention has been described in the form of preferred embodiments thereof for purposes of illustration only and the invention is not limited thereto but only by the scope of the following claims.

What is claimed is:

1. An information handling apparatus for use with a plurality of cartridges each containing an information recording medium, said apapratus comprising:

information processing means for processing information on information recording media contained in said cartridges;

first and second cartridge holding means for holding individual cartridges;

first and second information transfer means for transferring the information recording media between cartridges held by said first and second holding means, respectively, and said information processing means;

means for selectively operating said first and second transfer means;

a housing containing said information processing means, said first and second cartridge holding means, said first and second information transfer means, and said operating means, said housing having an outer wall formed with a cartridge insertion opening for permitting manual insertion of a single cartridge from outside said housing into said housing, said opening being located and arranged to guide such inserted cartridge to said second cartridge holding means;

cartridge storage means for storing a plurality of said cartridges; and cartridge transporting means near said cartridge storage means for selectively transporting individual cartridges from said storage means to said first cartridge holding means.

2. An information handling apparatus according to claim 1, wherein said cartridge storage means includes a support base for storing the plurality of said cartridges as well as means for moving said support base.

3. An information handling apparatus according to claim 2, wherein said support base has one or more drums on which the cartridges are removably stored and wherein each of said drums is secured to a rotable shaft.

4. An information handling apparatus according to claim 2, wherein said cartridge transporting means includes gripping means capable of mounting or dismounting a cartridge relative to said cartridge storing means as well as means for moving said gripping means to the first position.

5. An information handling apparatus according to claim 1 wherein said information transfer means includes a first passage for guiding the recording medium from the cartridge placed at the first position, a second passage for guiding the recording medium from the cartridge placed at the second position, and a third passage, said first passage and said second passage converging at said third passage such that the recording medium from either of the cartridges placed at the first position may be transported through said third passage, said information processing means comprising a projecting means disposed along said third passage.

6. An information handling apparatus according to claim 5, wherein said information transfer means comprises recording medium transporting means including transporting means for transporting said recording medium of the cartridge placed in the first position to said first passage, and second transporting means for transporting said recording medium of the cartridge placed in the second position to said second passage.

7. An information handling apparatus according to claim 6, further comprising takeup means for taking up the recording medium transported through said third passage.

8. An information handling apparatus according to claim 6, wherein said first and second transporting means each comprises a motor driven roller for engaging the recording medium stored in said cartridges and transporting the recording medium through said first and second passages, respectively.

9. An information handling apparatus according to claim 6, wherein said recording medium transporting means further includes a motor driven roller for engaging the recording medium and transporting the recording medium through said third passage.

10. An information handling apparatus according to claim 1, further comprising a first housing and a second housing which are separable, said cartridge storing means and said cartridge transporting means being disposed in said first housing and said cartridge holding means and said recording medium transporting means being disposed in said second housing.

11. An information handling apparatus according to claim 1, wherein said information processing means includes optical means for projecting the information recorded on the recording medium and a screen for observing the projected information.

12. An information handling apparatus according to claim 1, wherein said information processing means includes readout means for reading the information of the recording medium and for converting the same into electrical signals and reproducing means for reproducing the information on the basis of said electrical signals.

13. An information handling apparatus according to claim 1, wherein the recording medium is a microfilm.

14. An information handling apparatus according to claim 1, wherein said information processing means includes retrieving means for retrieving desired information recorded on the recording medium and for positioning the retrieved informatioan in a projecting means.

15. An information handling apparatus according to claim 1 wherein said means forming a passageway comprises a first housing having a slot extending from the exterior thereof to said record holding means.

16. An information handling apparatus according to claim 1 wherein said information processing means comprises a readout means for reading the information of said recording medium stored in cartridges placed in said first and second positions.

17. An information handling apparatus according to claim 16, wherein said readout means includes illuminating means for illuminating the recording medium, photoelectric transducer means for receiving the light from the recording medium, and reproducing means for reproducing information on the basis of electrical signals outputted from said photoelectric transducer means.

18. An information handling apparatus according to claim 16, wherein said first and second information transfer means comprise first recording medium transporting means for transporting the recording medium of the cartridge placed in the first position to said readout means and second recording medium transporting means for transporting the recording medium of the cartridge placed in the second position to said readout means.

19. An information handling apparatus according to claim 1, wherein said cartridge storing means said cartridge moving means are disposed in a second housing and wherein said holding means and said readout means are disposed in said first housing.

20. An information handling apparatus according to claim 19 wherein said first and second housings are separable from each other.

21. An information handling apparatus according to claim 17, wherein said first and second information transfer means comprise first recording medium transporting means for transporting the recording medium of the cartridge placed in the first position to said readout means, and second recording medium transporting means for transporting the recording medium of the cartridge placed in the second position to said readout means.

22. An information handling apparatus according to claim 1, wherein said information transfer means has a retrieving means for retrieving information recorded on the recording medium and for positioning the retrieved information at a predetermined position relative to said readout means.

23. An information holding apparatus according to claim 20, wherein said cartridge transporting means includes gripping means for gripping a cartridge and means for reciprocating said gripping means between said storing means and said first position.

24. Apparatus for retrieving and displaying information, comprising:

a housing;

a storage chamber formed within said housing for storing a plurality of receptacles which hold information recording media;

a receptacle transporting means for transporting a selected receptacle from the storage chamber to a first position within the housing and returning the receptacle from the first position to the storage chamber;

said housing having an outer wall formed with a receptacle insertion opening positioned and arranged to guide a receptacle manually inserted therein from outside the housing to a second position in the housing at which information in said receptacle can be extracted for display;

a mode selecting means for selecting either one of a mode in which a receptacle in said storage chamber is used and a mode in which a receptacle placed outside the housing is used;

a first feeding means for feeding the information recording medium of said receptacle held in said first position to a position where said information recording medium is utilized;

a second feeding means feeding the information recording medium in said receptacle held in said second position to said position where said information recording medium is utilized; and means for selectively operating said first and second feeding means in accordance with an output signal from said mode selecting means;

a retrieving means for retrieving information recorded on the information recording medium; and a displaying means for displaying the information retrieved by the retrieving means.

25. A cartridge exchanging apparatus for automatically exchanging a cartridge containing an information recording medium, said apparatus comprising:

a cartridge storing means for storing a plurality of cartridges within the apparatus;

a transporting means for transporting a selected cartridge from said cartridge storing means to a first position within said apparatus;

a housing having an outer wall formed with a cartridge insertion opening positioned and arranged to guide a cartridge manually inserted therein from outside the housing to a second position in the housing at which information in said cartridge can be extracted for display;

a mode selecting means for selecting either one of a mode in which a cartridge in said cartridge storing means is used and a mode in which a cartridge placed outside the apparatus is used;

a first feeding means for feeding the information recording medium of said cartridge held in the first position to a position where said information recording medium is utilized;

a second feeding means for feeding the information recording medium in said cartridge held in the second position to the position where said information recording medium is utilized; and means for selectively operating said first and second feeding means in accordance with an output signal from said mode selecting means.

* * * * *